United States Patent [19]
Cotton et al.

[11] Patent Number: 5,572,355
[45] Date of Patent: Nov. 5, 1996

[54] OPTICAL SYSTEM FOR STRETCHING, COMPRESSING AND AMPLIFYING ULTRASHORT OPTICAL PULSES

[75] Inventors: Christopher Cotton, Honeoye Falls, N.Y.; Yang Pang, Ann Arbor, Mich.

[73] Assignee: Clark MXR, Inc., Dexter, Mich.

[21] Appl. No.: 432,576

[22] Filed: May 1, 1995

[51] Int. Cl.$^6$ ............ H01S 3/00; H04B 10/04; G02B 26/00
[52] U.S. Cl. ............ 359/333; 359/346; 359/184; 359/238
[58] Field of Search ............ 359/182, 184, 359/185, 344, 346, 333, 238

[56] References Cited

U.S. PATENT DOCUMENTS

| | | | |
|---|---|---|---|
| 5,166,818 | 11/1992 | Chase et al. | 359/170 |
| 5,329,398 | 7/1994 | Lai et al. | 359/556 |
| 5,416,629 | 5/1995 | Huber | 359/182 |
| 5,453,871 | 9/1995 | Kolner et al. | 359/238 |

OTHER PUBLICATIONS

Quintic–phase–limited, spatially uniform expansion and recompression of ultrashort optical pulses—Optical Society of America/Optics Letters vol. 18, No. 19.

*Primary Examiner*—Mark Hellner
*Attorney, Agent, or Firm*—Cumpston & Shaw

[57] ABSTRACT

An apparatus for stretching or compressing an ultrashort pulse in time that is free of non-linear and spatial distortion (temporal or spatial frequency chirp) comprises a first diffraction grating G, a concave spherically curved mirror [CCM] with a radius of curvature $R_1$, a convex spherically curved mirror [CXM] with a radius of curvature $R_2$, and a flat reflector, [PM]. As a result of propagation of the ultrashort input pulse through this system, the output pulse is either stretched (or compressed) in time so that it now has a duration many times longer (or many times shorter) than its input pulse duration, is spatially uniform (i.e. has no spatial chirp,) and collimated. It can be separated from the input pulse by passage through a Faraday isolator. If the invention is to be configured as a stretcher, the stretched pulse can then be seeded into an amplifier stage, wherein it is amplified by many orders of magnitude, without placing the materials within the system at risk of damage due to self-focusing. Subsequently it is temporally compressed by a similar design or other designs known to those skilled in the art. It may also be recompressed by an identical optical design wherein the grating is repositioned relative to the concave mirror so as to recompress the pulse.

51 Claims, 2 Drawing Sheets

OPTICAL SYSTEM FOR STRETCHING, COMPRESSING AND AMPLIFYING ULTRASHORT OPTICAL PULSES

FIELD OF THE INVENTION

The subject invention relates to a method and apparatus for use in amplifying ultrashort optical pulses without introducing unwanted distortions. Specifically, this invention describes a unique configuration that can be used to stretch and/or compress ultrashort pulses which eliminates unwanted distortions that can adversely effect the ability of an ultrashort pulse amplifier to produce very short amplified pulses. At the same time the invention reduces the overall sensitivity of these elements to misalignment.

BACKGROUND OF THE INVENTION

Chirped-pulse amplification (CPA, also sometimes referred to as a regenerative amplification) has allowed the high energy storage capacity of solid-state gain media to be exploited for the generation of ultrashort laser pulses with extremely high peak intensities (by ultrashort we mean pulses whose pulsewidth at Full Width Half Maximum, FWHM, is substantially below 1 nanosecond). By stretching in time (frequency-chirping) the input low peak power seed pulse with a dispersive delay line (i.e. a stretcher), it is possible to reduce the peak intensity during amplification, thereby eliminating the deleterious and often catastrophic effects of the nonlinear interaction of the pulse with the reflective and/or refractive material of the system. After amplification, the stretched-pulse is recompressed by propagation through another dispersive delay line, which provides a frequency-chirping of opposite sign (i.e. a compressor) and consequently recompresses the pulse. The current CPA state-of-the-art can produce pulses with peak powers in excess of 50 TW and amplified pulse widths below 40 femtosecond.

Since 1985, chirped-pulse amplification (CPA) systems have matured to the point where they have become the most popular means to generating energetic short pulses. This advance is largely credited to our ability to carefully control higher order (non-linear) dispersion of the chirped pulse (these effects exist in multipass amplifiers, or system designs that incorporate elements of both, as well as single-pass power amplifier stages. The subject invention relates to all these types of amplifiers, and, unless specifically stated, the term amplifier is intended to be inclusive of all of them). For many applications it is critically important that the amplified and recompressed pulse shape be a replica of the input pulse shape. More specifically one wants to avoid pulse wings or satellite pulses that are temporally shifted with respect to the main pulse. This "pulse fidelity" is affected by several factors: amplified spontaneous emission, system bandwidth limitations, and high-order phase errors introduced by the stretching and compression process.

Amplified spontaneous emission and bandwidth limitations not associated with the stretcher and compressor design are important concerns in laser system engineering but are not the object of this invention. The focus of this invention is the effect of higher-order phase errors that arise in the stretching and compression process and our ability to compensate for them. The stretcher and the compressor alter the pulse length through the frequency-dependent phase shifts they impose on the pulse. This phase function can be Taylor expanded about the central frequency of the laser:

$$\phi(\omega) = \Omega_o + \phi_1(\omega-\omega_o) + \phi_2(\phi-\phi_o)^2 + \phi_3(\phi-\phi_o)^3 + \phi_4(\phi-\phi_o)^4$$

The zero- and first-order terms are the overall phase shift and group delay of the pulse, respectively, and do not affect the pulse width. The second-order term, $\phi_2$, is the group-delay dispersion and produces a linear chirp on the pulse. It is the largest non-negligible term in the phase function and produces the stretching or compression of the pulse. The next two higher-order terms, $\phi_3$, (the so-called cubic term) and $\phi_4$, (the so-called quartic term) produce a nonlinear chirp, or distortion of the pulse, and it is the incomplete cancellation of these higher-order terms that most significantly reduces the pulse fidelity (and creates temporal wings or satellites on the output pulse). The Taylor expansion shows clearly that, the larger the bandwidth ($\phi-\phi_o$), the more important the contribution of the higher order terms. As the pulse width falls below 100 fs it becomes increasingly important to be able to control the higher order non-linear contributions, especially the cubic and quartic terms.

Imaging errors (aberrations) in the stretcher may cause a mismatch between the stretcher and compressor phase functions. These errors may be partially eliminated by using an imaging system that compensates both spherical and chromatic aberration. However, because the phase function of the material in the amplifier chain does not match the phase function of the compressor, the phase shift produced during amplification cannot be completely compensated by a simple change in the compressor length. Thus, a perfectly matched stretcher and compressor will not provide the best compressed pulses because the design is unable to compensate for the material of the amplifier chain.

The basic requirement that the total frequency dependent phase shift of the pulse by the laser system be zero indicates that some method must be found to compensate for the higher-order terms in the phase function—principally the cubic and quartic terms. Through ray tracing, Lemoff and Barry in "Quintic phase-limited, spatially uniform expansion and recompression of ultrashort optical pulses," Optics Letters Vol. 18 No. 19 Oct. 1, 1993 have found that they were able to design a stretcher and compressor that can compensate up to quartic phase. They achieved this by changing the input angles of the compressor (with respect to the input angle of the stretcher) and including the correct length of material in their optical chain. Although this seems to work, their design requires extremely precise alignment of the entire optical chain and is somewhat inflexible to changes in the laser system. Other designs reported in the literature have similar limitations, which are beyond the scope of the presentation here.

The designs proposed to date are plagued by serious deficiencies. An ideal stretcher-compressor system would utilize high reflectivity gratings for their broad band efficiency and stretching-compressing capability. Is should also be able to compensate (or at least minimize) cubic and quartic phase errors, be free of spatial chirp, possess relaxed alignment tolerances, and be compact. This invention meets these requirements.

SUMMARY OF THE INVENTION

It is an object of the invention to stretch an ultrashort pulse using a pair of spherical reflective surfaces, one concave and the other convex, with parameters chosen to control the quartic phase error in the system.

It is a further object of the invention to compress an ultrashort pulse using a pair of spherical reflective surfaces, one concave and the other convex, with radii chosen to control the quartic phase error of the system.

It is a still further object of the present invention to provide a chirped pulse amplification system that uses a stretcher and a compressor in accordance with the invention that is free of cubic and quartic phase error and spatial frequency chirp.

An apparatus for stretching or compressing an ultrashort pulse in time that is free of non-linear and spatial distortion (temporal or spatial frequency chirp) comprises a first diffraction grating G, a concave spherically curved mirror [CCM] with a radius of curvature $R_1$, a convex spherically curved mirror [CXM] with a radius of curvature $R_2$, and a flat reflector, [PM]. The ultrashort input pulse is initially incident on the diffraction grating at a vertical position $V_o$, oriented so that it is reflected toward the concave mirror (it is equally possible to conceive of a geometry that would make use of a transmissive grating or prism instead of a reflective grating. Such variations on the design are considered within the scope of the invention). Reflection of the pulse off the grating spreads the spectrum of the pulse into a collection of beams that differ chromatically (here we take the collection of beams that differ chromatically to be a fan of beams with different colors varying from shorter wavelength on one side to longer wavelength on the other). The diffracted beams propagate towards the concave mirror and are incident on it at a vertical position $V_1$. They are then reflected by the concave mirror to the convex mirror suitably oriented to intercept the beams and reflect them back to the concave mirror and upon which they are incident at a position, $V_2$, slightly displaced from position $V_1$. Subsequently the beams are once again reflected off the concave mirror back toward the grating and upon which it is incident at a vertical position $V_3$ displaced from $V_o$. The beams are then reflected off the grating a second time, after which it is spatially chirped and collimated, this time propagating toward the flat reflector [PM]. The flat reflector intercepts this spatially dispersed beam and reflects it back through the optical system along the same path in the reverse direction, whereupon it exits the system along a path substantially identical to that taken by the input, but this time propagating in the opposite direction. As a result of propagation through this system, the output pulse is either stretched (or compressed) in time so that It now has a duration many times longer (or many times shorter) than its input pulse duration, is spatially uniform (i.e. has no spatial chirp,) and collimated. It can be separated from the input pulse by passage through a Faraday isolator (those skilled in the art will recognize that there are other ways of separating the input from the output, for example by slightly displacing them from each other in the vertical direction). If the invention is to be configured as a stretcher, the stretched pulse can then be seeded into an amplifier stage, wherein it is amplified by many orders of magnitude, without placing the materials within the system at risk of damage due to self-focusing. Subsequently it is temporally compressed by a similar design or other designs known to those skilled in the art. It may also be recompressed by an identical optical design wherein the grating is repositioned relative to the concave mirror so as to recompress the pulse.

The invention along with the aforementioned objects and advantages will now be clearly set forth with reference to the detailed drawings which are described as follows:

DETAILED DESCRIPTION

Figure 1:
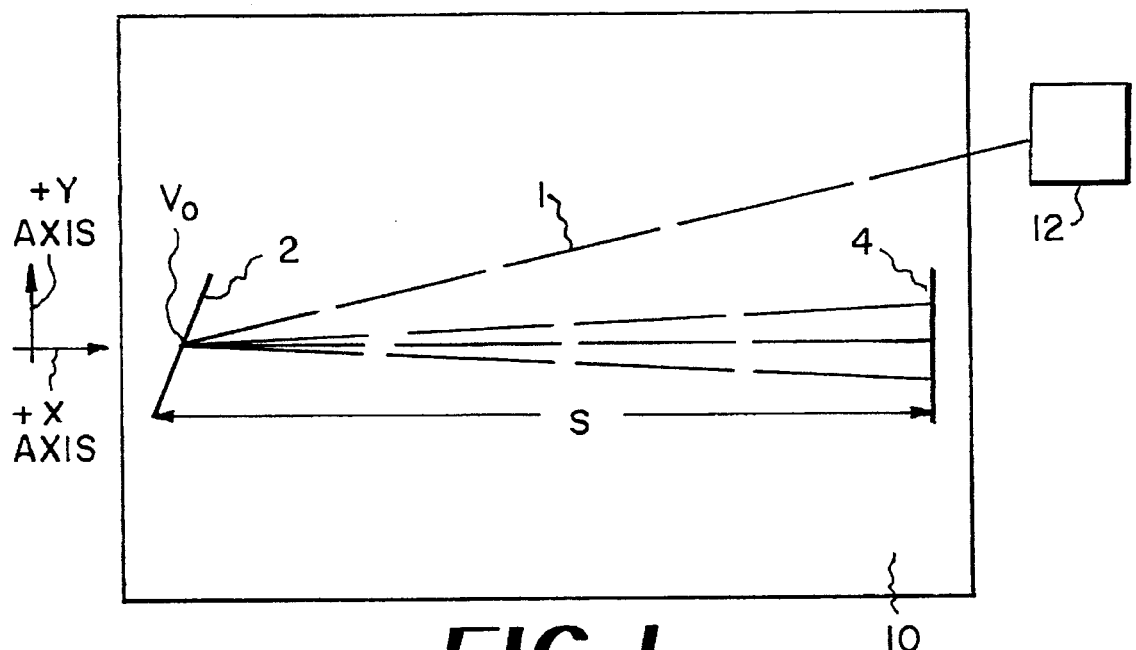
FIG. 1 shows a schematic top view of the first two elements of tile invention consisting of the grating, 2, and tile concave mirror, 4, viewed from above. The positive z-axis direction of reference is the normal to the plane of the drawing pointing toward the reader, the positive y-axis direction points toward the top edge of the paper as shown, and the positive x-axis direction points toward the fight edge of the paper, also as shown.
Figure 2:
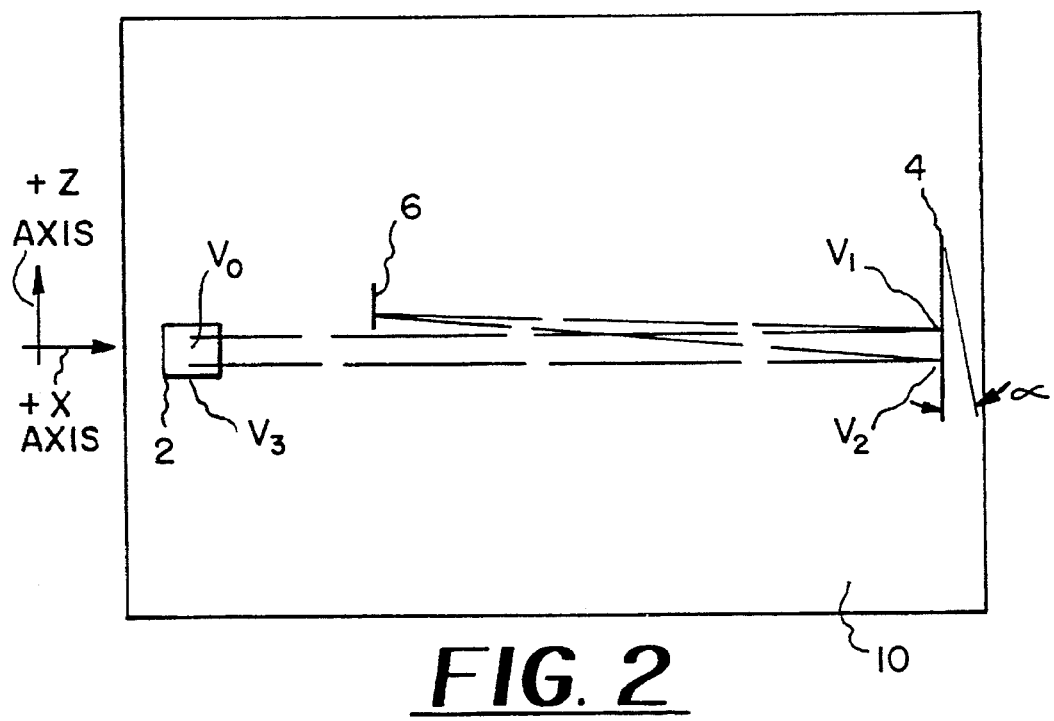
FIG. 2 shows a schematic side view of the invention sighting along the positive y-axis direction, and shows the partially open face of the grating, 2, on the left that is visible from the direction, the concave mirror, 4, and the convex mirror, 6. Note that the paths of the diffracted beams as they propagate from one element of the system to the other are displaced slightly in the vertical direction.
Figure 3:
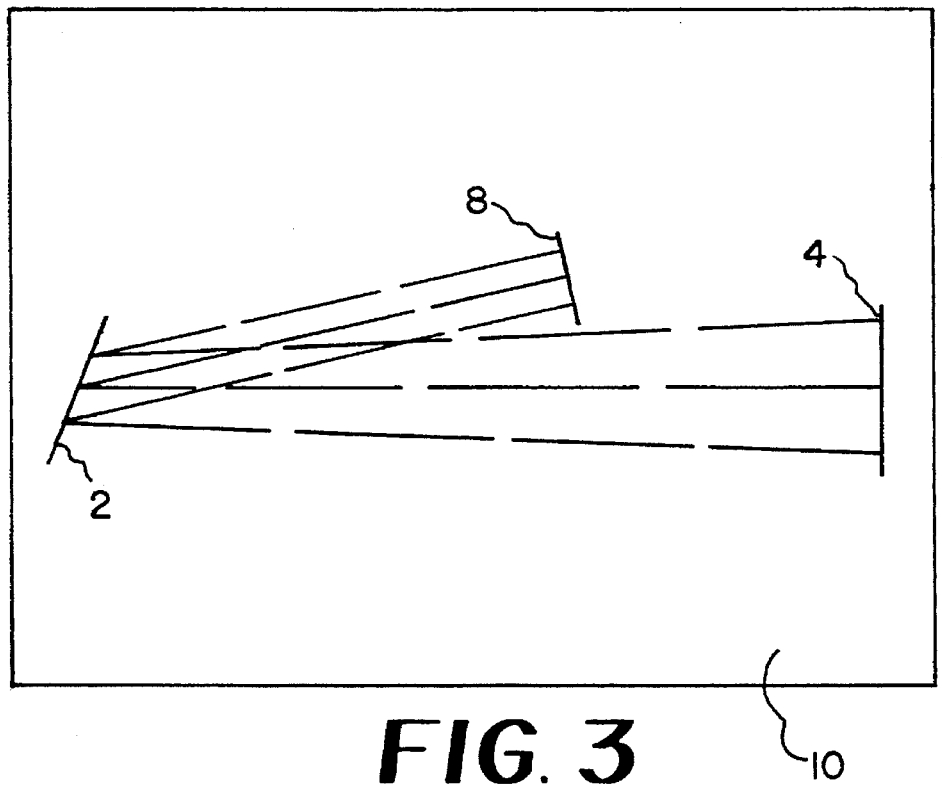
FIG. 3 shows a schematic bottom view of the invention with the grating, 2, the concave mirror 4, and the flat reflector, 8, illustrated.

A pulse stretcher 10 in accordance with a presently preferred embodiment of this invention includes four components:

1) a reflective plano diffraction grating 2;
2) a concave spherically curved mirror 4 with a radius of curvature $R_1$;
3) a convex spherically curved mirror 6 with a radius of curvature $R_2$; and
4) a plano mirror 8.

the mode locked input pulse from source 12 is initially incident on the diffraction grating 2 which is oriented with the grooves parallel to the z-axis. The grating transforms the mode locked pulse into a fan of beams that are parallel to the y-x-plane. The diffracted fan is allowed to expand towards the concave mirror which is at a distance s away (FIG. 1). The diffracted fan of beams is then collected and brought to a line focus by the concave mirror 4. The concave mirror is rotated by a small angle x about the y-axis to move the focus out of the plane of the diffracted fan from the grating (FIG. 2). The convex mirror 6 is placed at the line focus produced by the concave mirror. The separation between the concave and the convex mirror is equal to the focal length, or one-half the radius of curvature, of the concave mirror 4 ($0.5*R_1$). The convex mirror 6 increases the divergence of the diffracted fan and reflects it back towards the concave mirror 4. The convex mirror 6 is rotated about the y-axis to separate the input and output diffracted fans at the concave mirror 4 and the grating 2. The diffracted fan is made to converge by the second reflection from the concave mirror 4, thus producing an image of the grating at a distance of $R_1*(1-0.5*R_1/R_2)$-s from the concave mirror 4 and a distance of $R_1*(1-05*R_1/R_2)-2*s$ past the diffraction grating 2. The fan is then incident on the diffraction grating 2 a second time (FIG. 3). The grating 2 causes the diffracted beams of the fan to become parallel. The parallel beams are then retro-reflected by the piano mirror 8, which returns the diffracted fan back through the entire system. The output from this stretcher system is temporally stretched and can be recompressed to its original duration by a standard two grating compressor.

For example, a preferred embodiment of a stretcher in accordance with the invention for stretching ultrashort pulses with a pulse duration of, for example, 20 femtoseconds FWHM and a central wavelength of 800 nm is described by referring again to FIG. 1 (the detailed description presented here is intend to be purely illustrative of one particular implementation of the design and is not intended to be limiting in any sense). In this particular embodiment, the grating 2 has a periodicity of 1200 lines/mm, a length of 200 mm, and a height of 50 mm. The system is arranged so that the angle of incidence of the input ultrashort pulse beam 1, is approximately 35 degrees with respect to the normal to the surface of the grating (unlike other stretchers, our invention is particularly insensitive to variations in the input angle by as much as several degrees—a distinct advantage over earlier designs in its own right) and strikes the grating 2 at a position thereon identified as $V_o$. Upon reflection off the grating, 2, the pulse fans out in the plane of the paper, 3, as it propagates toward the concave mirror, 4. The concave mirror is rectangularly shaped, and is chosen to have a width of 500 mm, a height of 50 mm, and a radius of curvature of 1219.32 mm. The separation between the grating, 2, and the concave mirror, 4, is chosen to have a value, s, equal to 916.4mm, and the beam is incident on the mirror 4 at a position, $V_1$, slightly displaced from the center of the mirror in the vertical direction by an amount as small as possible but sufficient to ensure that all beams are separated from each other.

Referring now to FIG. 2, the fan of beams is reflected off the concave mirror 4 which is tilted at an angle of 2.5 degrees with respect to z-axis toward the convex mirror, 6, positioned at a distance 608.0 mm from the concave mirror, 4. The convex mirror is also of rectangular shape, and is chosen to have length (in the plane of the page) of about 300 mm, a height (along the z-axis) of 25 mm, and a radius of curvature of about 750 mm (this radius of curvature dimension need not be extremely critical to achieve the intended result), and is oriented at an angle of 6 degrees tilt with respect to the vertical. Thus, upon reflection off the convex mirror, the fan of beams is directed back toward the concave mirror, 4, on which it is incident at a position, $V_2$, on the concave mirror, and then back onto the grating, 2, at a position below center in the z-axis direction, $V_3$. Referring now to the top view shown in FIG. 3, the fan of beams reflected a second time off the grating, 2, impinges on the flat reflector, 8, chosen to have a length of 150 mm in the plane of the page, a height of 25 mm, and is placed at a distance of 800 mm from the grating, 2. The orientation of the flat reflector, 8, is arranged so that the fan of beams incident on it are substantially retroreflected back through stretcher, to produce an output pulse duration of 216 picoseconds, FWHM.

Figure 4:
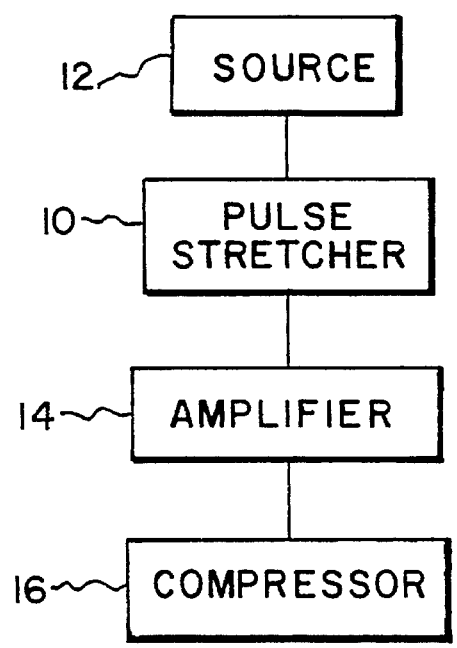
FIG. 4 shows a flow diagram of the invention with the pulse source 12, the pulse stretcher 10, the amplifier 14, and the compressor 16.

Turning to FIG. 4, the identical design can be used to compress a pulse that has been stretched from say 20 fs to 216 picoseconds after amplification. When this system is used as a compressor 16 the distance between the grating and the concave mirror, s, is increased to a value of 1217 mm. The input is now 216 ps and follows the same path as the input to the previously described stretcher configuration 10, and the output is recompressed to approximately 20 rs. When an amplifier 14 is incorporated between the stretcher 10 and compressor 16, it will introduce its own non-linear chirp. It is known by those skilled in the art that the cubic component can be compensated by a suitable adjustment in the orientation of the angle of incidence of the input to the grating in either stretcher or the compressor[3] (essentially it is the proper setting of the difference in the angles of incidence of the input beams to the stretcher and compressor suitable chosen that can be used compensates for all the sum total of cubic phase distortion introduced by all the components in the system). The quartic component introduced by the dispersive material in the amplifier is generally small, and can often be neglected. In the case in which the quartic contribution of the nonlinear chirp introduced by the amplifier 14 cannot be neglected (for example when the input and output pulse is extremely short), it can be compensated by appropriate choice of the radii of curvature of the reflective surfaces in the compressor.

The foregoing description of the invention is intended to be merely exemplary of the invention and those skilled in the art will appreciate that certain changes and modifications to the method and apparatus described above are well within the scope of the invention which is solely defined by the appended claims.

What is claimed:

1. An apparatus for altering the temporal pulsewidth of an ultrashort pulse comprising:

a dispersive element arranged to receive an input beam to produce a collection of output beams that differ chromatically;

a concave reflecting surface disposed to receive and reflect the collection of beams at a first location;

a convex reflecting surface, disposed to receive the collection of beams from the concave reflecting surface to reflect said collection of beams, arranged so that a temporally altered pulsewidth of an ultrashort pulse has an approximate minimal quartic phase chirp.

2. The apparatus of claim 1 in which said concave reflecting surface has a radius, $R_1$, and is separated from said dispersive element by a distance, s, and said convex reflecting surface has a radius of approximately $R_2$, wherein $R_2=(R_1)^2$ divided by *2s, and the convex mirror is spaced from the concave mirror a distance $R_1/2$.

3. The apparatus of claim 1 in which the elements are arranged to stretch a pulse in time.

4. The apparatus of claim 1 in which the elements are arranged to compress a pulse in time.

5. The apparatus of claim 1 in which said dispersive element is selected from the group consisting of dispersive elements comprising a reflective grating, a plurality of reflective gratings, a transmissive grating, a plurality of transmissive gratings, a prism, or a plurality of prisms.

6. The apparatus of claim 2 in which said dispersive element is selected from one or more of a group of dispersive elements comprising a reflective gratings, a plurality of reflective gratings, a transmissive grating, a plurality of transmissive gratings, a prism, or a plurality of prisms.

7. The apparatus of claim 3 in which said dispersive element is selected from one or more of a group of dispersive elements comprising a reflective grating, a plurality of reflective gratings, a transmissive grating, a plurality of transmissive gratings, a prism, or a plurality of prisms.

8. The apparatus of claim 1 in which the concave reflective surface and the convex reflective surface are arranged so that the collection of beams reflected from the convex reflective surface is received by the concave reflective surface a second time at a second location spaced apart from the first location and reflected towards the dispersive element.

9. The apparatus of claim 8 in which the dispersive surface receives the beam from the concave reflective surface and produces a beam directed towards a flat reflective surface.

10. The apparatus of claim 9 in which the beam is reflected by the flat reflective surface back to the dispersive element, concave reflecting surface, convex reflecting surface, back to the concave reflecting surface to the dispersive element and produces an output beam.

11. A method of altering the temporal pulsewidth of an ultrashort pulse comprising the steps of:

spatially dispersing said ultrashort pulse chromatically;

focusing the dispersed ultrashort pulse to a line focus;

and diverging the line focused pulse, said focusing and diverging steps including introducing compensating spherical aberrations so that the net spherical aberration is minimized so as to produce an approximately minimum quartic phase chirp.

12. The method of claim 11 comprising the additional step of collimating the diverging ultrashort pulse.

13. The method of claim 12 comprising:

retroreflecting the collimated pulse; and spatially reconstructing the retroreflected pulse.

14. An apparatus for amplifying an ultrashort pulse comprising:

a source of ultrashort pulses, a stretcher for receiving ultrashort pulses from the source and stretching the ultrashort pulses in time, the stretcher comprising:

a dispersive element arranged to receive the ultrashort pulses and to produce a collection of output beams that differ chromatically;

a concave reflecting surface disposed to receive and reflect said collection of beams at a first location;

a convex reflecting surface, also disposed to receive the collection of beams from the concave reflecting surface and reflect said collection of beams;

an amplifier for amplifying said stretched ultrashort pulses; and a compressor for compressing said ultrashort pulses, so that an amplified ultrashort pulse has an approximate minimal cubic and quartic phase chirp.

15. The apparatus of claim 14 in which said concave reflecting surface has a radius, $R_1$, and is separated from said dispersive element by a distance, s, and said convex reflecting surface has a radius of approximately $R_2$, wherein $R_2 = (R_1)^2$ divided by 2s and the convex mirror is spaced from the concave mirror a distance $R_1/2$.

16. The apparatus of claim 14 in which the elements are arranged to stretch a pulse in time.

17. The apparatus of claim 14 in which the elements are arranged to compress a pulse in time.

18. The apparatus of claim 14 in which said dispersive element selected from the group consisting of dispersive elements comprising a reflective grating, a plurality of reflective gratings, a transmissive grating, a plurality of transmissive gratings, a prism, or a plurality of prisms.

19. The apparatus of claim 15 in which said dispersive element is selected from one or more of a group of dispersive elements comprising a reflective grating, a plurality of reflective gratings, a transmissive grating, a plurality of transmissive gratings, a prism, or a plurality of prisms.

20. The apparatus of claim 19 in which said dispersive element is selected from one or more of a group of dispersive elements comprising a reflective grating, a plurality of reflective gratings, a transmissive grating, a plurality of transmissive gratings, a prism, or a plurality of prisms.

21. The apparatus of claim 14 in which the concave reflective surface and the convex reflective surface are arranged so that the collection of beams reflected from the convex reflective surface is received by the concave reflective surface a second time at a second location spaced apart from the first location and reflected towards the dispersive element.

22. The apparatus of claim 21 in which the dispersive surface receives the beam from the concave reflective surface and produces a beam directed towards a flat reflective surface.

23. The apparatus of claim 22 in which the beam is reflected by the flat reflective surface back to the dispersive element, concave reflecting surface, convex reflecting surface, back to the concave reflecting surface to the dispersive element and produces an output beam.

24. A method of amplifying an ultrashort pulse comprising:

generating an ultrashort seed pulse, stretching said ultrashort seed pulse by:

spatially dispersing said ultrashort pulse chromatically;

focusing the dispersed ultrashort pulse to a line focus;

and diverging the line focused pulse, said focusing and diverging steps including introducing compensating spherical aberrations so that the net spherical aberration is minimized so as to produce an approximately minimum quartic phase chirp:

amplifying said stretched ultrashort seed pulse, compressing said amplified ultrashort seed pulse in time, so that the amplified ultrashort seed pulse has an approximate minimal cubic and quartic phase chirp.

25. The method of claim 24 comprising the additional step of collimating the diverging ultrashort pulse.

26. The method of claim 25 comprising:

retroreflecting the collimated pulse; and spatially reconstructing the retroreflected pulse.

27. An apparatus for amplifying an ultrashort pulse comprising:

a source of ultrashort pulses;

a stretcher for stretching ultrashort pulses in time;

an amplifier for amplifying said stretched ultrashort pulses; and a compressor for compressing said ultrashort pulses comprising:

a dispersive element arranged to receive an input beam to produce a collection of output beams that differ chromatically;

a concave reflecting surface disposed to receive and reflect the collection of beams at a first location;

a convex reflecting surface, disposed to receive the collection of beams from the concave reflecting surface to reflect said collection of beams, arranged so that an amplified ultrashort pulse has an approximate minimal cubic and quartic phase chirp.

28. The apparatus of claim 27 in which said concave reflecting surface has a radius, $R_1$, and is separated from said dispersive element by a distance, s, and said convex reflecting surface has a radius of approximately $R_2$, wherein $R_2 = (R_1)^2$ divided by 2*s and the convex mirror is spaced from the concave mirror a distance $R_1/2$.

29. The apparatus of claim 27 in which the elements are arranged to stretch a pulse in time.

30. The apparatus of claim 27 in which the elements are arranged to compress a pulse in time.

31. The apparatus of claim 27 in which said dispersive element is selected from the group consisting of dispersive elements comprising a reflective grating, a plurality of reflective gratings, a transmissive grating, a plurality of transmissive gratings, a prism, or a plurality of prisms.

32. The apparatus of claim 28 in which said dispersive element is selected from one or more of a group of dispersive elements comprising a reflective grating, a plurality of reflective gratings, a transmissive grating, a plurality of transmissive gratings, a prism, or a plurality of prisms.

33. The apparatus of claim 29 in which said dispersive element is selected from one or more of a group of dispersive elements comprising a reflective grating, a plurality of reflective gratings, a transmissive grating, a plurality of transmissive gratings, a prism, or a plurality of prisms.

34. The apparatus of claim 27 in which the concave reflective surface and the convex reflective surface are arranged so that the collection of beams reflected from the convex reflective surface is received by the concave reflective surface a second time at a second location spaced apart from the first location and reflected towards the dispersive element.

35. The apparatus of claim 34 in which the dispersive surface receives the beam from the concave reflective surface and produces a beam directed towards a flat reflective surface.

36. The apparatus of claim 35 in which the beam is reflected by the flat reflective surface back to the dispersive element, concave reflecting surface, convex reflecting surface, back to the concave reflecting surface to the dispersive element and produces an output beam.

37. A method of amplifying an ultrashort pulse comprising:

generating an ultrashort seed pulse, stretching said ultrashort seed pulse amplifying said stretched ultrashort seed pulse, compressing said ultrashort seed pulse by, spatially dispersing said ultrashort pulse chromatically;

focusing the dispersed ultrashort pulse to a line focus;

and diverging the line focused pulse, said focusing and diverging steps including introducing compensating spherical aberrations so that the net spherical aberration is minimized so as to produce an approximately minimum quartic phase chirp.

38. The method of claim 37 comprising the additional step of collimating the diverging ultrashort pulse.

39. The method of claim 38 comprising:

retroreflecting the collimated pulse; and spatially reconstructing the retroreflected pulse.

40. An apparatus for amplifying an ultrashort pulse comprising:

a source of ultrashort pulses, a stretcher for stretching ultrashort pulses in time comprising:

a dispersive element arranged to receive an input beam to produce a collection of output beams that differ chromatically;

a concave reflecting surface disposed to receive and reflect the collection of beams at a first location;

a convex reflecting surface, disposed to receive the collection of beams from the concave reflecting surface to reflect said collection of beams, an amplifier for amplifying said stretched ultrashort pulses, a compressor for compressing said ultrashort pulses comprising:

a dispersive element arranged to receive an input beam to produce a collection of output beams that differ chromatically;

a concave reflecting surface disposed to receive and reflect the collection of beams at a first location:

a convex reflecting surface, disposed to receive the collection of beams from the concave reflecting surface to reflect said collection of beams, arranged so that the amplified ultrashort pulse has an approximate minimal cubic and quartic phase chirp.

41. The apparatus of claim 40 in which said concave reflecting surface has a radius, $R_1$, and is separated from said dispersive element by a distance, s, and said convex reflecting surface has a radius of approximately $R_2$, wherein $R_2 = (R_1)^2$ divided by $2*s$ and the convex mirror is spaced from the concave mirror a distance $R_1/2$.

42. The apparatus of claim 40 in which the elements are arranged to stretch a pulse in time.

43. The apparatus of claim 40 in which the elements are arranged to compress a pulse in time.

44. The apparatus of claim 40 in which said dispersive element is selected from the group consisting of dispersive elements comprising a reflective grating, a plurality of reflective gratings, a transmissive grating, a plurality of transmissive gratings, a prism, or a plurality of prisms.

45. The apparatus of claim 41 in which said dispersive element is selected from one or more of a group of dispersive elements comprising a reflective grating, a plurality of reflective gratings, a transmissive grating, a plurality of transmissive gratings, a prism, or a plurality of prisms.

46. The apparatus of claim 42 in which said dispersive element is selected from one or more of a group of dispersive elements comprising a reflective grating, a plurality of reflective gratings, a transmissive grating, a plurality of transmissive gratings, a prism, or a plurality of prisms.

47. The apparatus of claim 40 in which the concave reflective surface and the convex reflective surface are arranged so that the collection of beams reflected from the convex reflective surface is received by the concave reflective surface a second time at a second location spaced apart from the first location and reflected towards the dispersive element.

48. The apparatus of claim 47 in which the dispersive surface receives the beam from the concave reflective surface and produces a beam directed towards a flat reflective surface.

49. The apparatus of claim 48 in which the beam is reflected by the flat reflective surface back to the dispersive element, concave reflecting surface, convex reflecting surface, back to the concave reflecting surface to the dispersive element and produces an output beam.

50. A method of amplifying an ultrashort pulse comprising:

generating an ultrashort seed pulse, stretching said ultrashog seed pulse by, spatially dispersing the ultrashort pulse;

focusing the dispersed ultrashort pulse to a line focus;

diverging the line focused pulse, the focusing and diverging steps including introducing compensating spherical aberrations so that the net spherical aberration is minimized;

retroreflecting the diverged pulse and spatially reconstructing the retroreflected pulse;

amplifying said reconstructed ultrashort seed pulse, compressing said ultrashort seed pulse by, spatially dispersing the ultrashort pulse;

focusing the dispersed ultrashort pulse to a line focus;

diverging the line focused pulse, the focusing and diverging steps including introducing compensating spherical aberrations so that the net spherical aberration is minimized;

retroreflecting the diverged pulse and spatially reconstructing the retroreflected pulse;

so that the reconstructed retroreflected pulse has an approximate minimal cubic and quartic phase chirp.

51. In a pulse stretcher/compressor for ultrashort pulses which stretcher/compressor includes at least one element that introduces positive spherical aberration, the improvement comprising:

at least one spherical reflector in the pulse stretcher/compressor having a negative spherical aberration selected to compensate for the spherical aberration of the at least one element to produce a net spherical aberration in the pulse stretcher/compressor close to zero for reducing quartic phase error.

* * * * *